(12) United States Patent
McKinney et al.

(10) Patent No.: US 8,060,624 B1
(45) Date of Patent: Nov. 15, 2011

(54) INITIATING A COMMUNICATION SESSION FROM A PRESENCE ENABLED MEDIA HOST DEVICE

(75) Inventors: David Uel McKinney, Olathe, KS (US); Shingara Singh Dhanoa, Overland Park, KS (US); Douglas Ray Green, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1065 days.

(21) Appl. No.: 11/209,578

(22) Filed: Aug. 23, 2005

(51) Int. Cl.
G06F 15/16 (2006.01)
H04L 12/28 (2006.01)
H04L 12/56 (2006.01)
H04N 7/173 (2011.01)

(52) U.S. Cl. ........ 709/228; 370/254; 370/390; 725/120; 725/111; 725/119

(58) Field of Classification Search .................... 709/228
See application file for complete search history.

(56) References Cited

U.S. PATENT DOCUMENTS

| | | | |
|---|---|---|---|
| 7,151,938 B2 | 12/2006 | Weigand | |
| 7,167,546 B2 * | 1/2007 | Moore | 379/88.12 |
| 7,356,137 B1 * | 4/2008 | Burg et al. | 379/211.01 |
| 2003/0073440 A1 * | 4/2003 | Mukherjee et al. | 455/435 |
| 2003/0101464 A1 | 5/2003 | Kye | |
| 2004/0037217 A1 | 2/2004 | Danzig et al. | |
| 2004/0172658 A1 * | 9/2004 | Rakib et al. | 725/120 |
| 2004/0177161 A1 | 9/2004 | Hoang | |
| 2004/0178801 A1 | 9/2004 | Hart, Jr. et al. | |
| 2004/0244044 A1 * | 12/2004 | Brommer | 725/111 |
| 2005/0238156 A1 | 10/2005 | Turner | |
| 2006/0168533 A1 | 7/2006 | Yip et al. | |
| 2006/0168538 A1 | 7/2006 | Stevens et al. | |
| 2006/0182249 A1 | 8/2006 | Archambault et al. | |
| 2006/0221857 A1 * | 10/2006 | Bushnell et al. | 370/254 |
| 2006/0271946 A1 | 11/2006 | Woundy | |
| 2007/0011233 A1 | 1/2007 | Manion et al. | |
| 2007/0043731 A1 * | 2/2007 | Wu et al. | 707/10 |
| 2009/0007199 A1 | 1/2009 | La Joie | |

* cited by examiner

Primary Examiner — Phuoc Nguyen
Assistant Examiner — Kishin G Belani (57) ABSTRACT

A presence enabled media host device is provided for accessing presence information associated with a number of communication endpoints and requesting the initiation of a communication session with at least one of the communication endpoints. The presence enabled media host device may access presence information, which includes information relating to the availability of a number of first communication endpoints. The presence enabled media host device may also receive a command requesting establishment of a communication session between at least one of the first communication endpoints and one or more second communication endpoints. The presence enabled media host device may then communicate a request for the communication session to a proxy server.

18 Claims, 5 Drawing Sheets

INITIATING A COMMUNICATION SESSION FROM A PRESENCE ENABLED MEDIA HOST DEVICE

CROSS-REFERENCE TO RELATED APPLICATIONS

This application is related by subject matter to the invention disclosed in the following commonly assigned application: U.S. application Ser. No. 11/209,911, filed on even date herewith, entitled "JOINING A COMMUNICATION SESSION FROM A PRESENCE ENABLED MEDIA HOST DEVICE," which is herein incorporated by reference in its entirety.

STATEMENT REGARDING FEDERALLY SPONSORED RESEARCH OR DEVELOPMENT

Not applicable.

TECHNICAL FIELD

This invention relates to initiating new communication sessions and/or joining ongoing communication sessions using a presence enabled media host device.

BACKGROUND

People often wish to communicate with others in a variety of different ways, such as text messaging, phone conferencing, and video conferencing, for example. However, it is often difficult to know whether other users are available for a communication session or whether other users are currently engaged in an ongoing communication session. Many people have media host devices (set-top boxes, digital video recorders, etc.) that may receive and source content to a display device, such as a television. The current state of the art could be advanced if users could access information regarding the availability of other users and either initiate new communication sessions or join ongoing communication sessions using their media host devices.

SUMMARY

Embodiments of the present invention are directed to accessing presence information on a media host device and requesting the initiation of a communication session using the media host device. Thus, in one aspect, an embodiment of the present invention relates to one or more computer-readable media having computer-usable instructions embodied thereon for causing a presence enabled media host device to perform a method for requesting the initiation of a communication session. The method includes accessing presence information on the presence enabled media host device. The presence information may include information relating to the availability of one or more first communication endpoints. The method also includes receiving a command on the presence enabled media host device requesting establishment of a communication session between at least one of the first communication endpoints and one or more second communication endpoints. The method further includes communicating a request for the communication session from the presence enabled media host device to a proxy server.

In another aspect of the invention, an exemplary embodiment is directed to a presence enabled media host device for initiating a communication session. The presence enabled media host device includes a watcher application and a session application. The watcher application is capable of accessing presence information from a presence server. The presence information may be associated with one or more first communication endpoints. The session application is capable of communicating a request to initiate a communication session between at least one of the first communication endpoints and one or more second communication endpoints.

A further aspect of the invention takes the form of a system for facilitating a communication session initiated by a presence enabled media host device. The system includes a presence enabled media host device and a network server. The presence enabled media host device is capable of accessing presence information associated with one or more first communication endpoints and of communicating a request to initiate a communication session between at least one the first communication endpoints and one or more second communication endpoints. The network server is capable of receiving the request from the presence enabled media host device and initiating the communication session based on the request.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

Media host devices commonly communicate with and receive television programming and other content from a media-delivery network (e.g., a cable television network or satellite television network). Embodiments of the present invention permit, among other things, a media host device communicating via a media-delivery network to access presence information associated with a number of communication endpoints, either within or outside of the media-delivery network. Using the presence information, in some embodiments, the media host device may initiate a communication session between one or more of those communication endpoints and a communication endpoint associated with the media host device user (which may be the media host device itself). In other embodiments, the media host device may be used to join a communication endpoint associated with the media host device user (which may be the media host device itself) with one or more communication endpoints in an already ongoing communication session. The communication session may be any of a variety of different types of sessions, such as a voice conferencing session, a video conferencing session, a chat session, a push to talk session, or an instant messaging session, for example.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| A-KEY | Authentication Key |
| BSC | Base Station Controller |
| BTS | Base Transceiver Station |
| CPE | Customer Premises Equipment |
| CMTS | Cable Modem Terminal System |
| DAVIC | Digital Audio Video Council |
| DOCSIS | Data Over Cable Service Interface Specification |
| DVR | Digital Video Recorder |
| ESN | Electronic Serial Number |
| HDR | Hard Disk Recorder |
| HFC | Hybrid Fiber Coaxial |
| IP | Internet Protocol |
| LAN | Local Area Network |
| MAC | Media Access Control |
| MIN | Mobile Identification Number |
| PC | Personal Computer |
| PDA | Personal Data Assistant |
| PDSN | Packet Data Serving Node |
| PSTN | Public Switched Telephone Network |
| PTR | Personal TV Receiver |
| PVR | Personal Video Recorder |
| PVS | Personal Video Station |
| RF | Radio Frequency |
| SIP | Session Initiation Protocol |
| STB | Set-Top Box |
| VPN | Virtual Private Network |
| WAN | Wide Area Network |

Further, various technical terms are used throughout this description. A definition of such terms can be found in *Newton's Telecom Dictionary* by H. Newton, 21st Edition (2005). These definitions are intended to provide a clearer understanding of the ideas disclosed herein but are in no way intended to limit the scope of the present invention.

As one skilled in the art will appreciate, the present invention may be embodied as, among other things: a method, system, or computer-program product. Accordingly, the present invention may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same.

Computer-storage media, or machine-readable media, include media implemented in any method or technology for storing information. Computer-storage media are non-transitory media. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
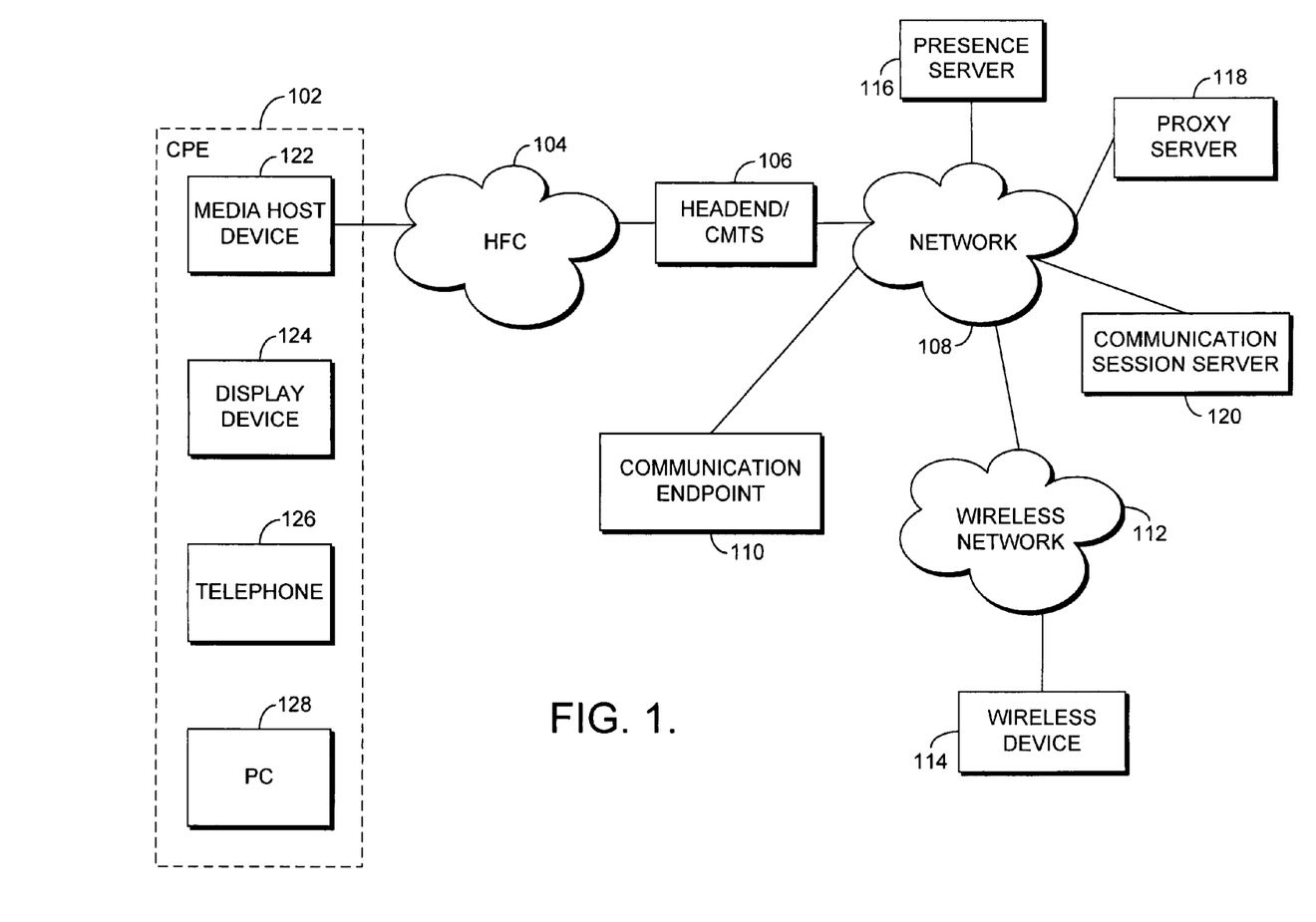
FIG. 1 is a block diagram of an exemplary system architecture suitable for use in implementing an embodiment of the present invention.

Referring to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, system 100 may include, among other components not shown, customer premises equipment (CPE) 102, a hybrid fiber coaxial (HFC) network 104, a headend/CMTS (cable modem terminal system) 106, a packet network 108, a communication endpoint 110, a wireless network 112, a wireless device 114, a presence server 116, a proxy server 118, and a communication session server 120. System 100 is an exemplary embodiment of the present invention showing a cable-television network as the media-delivery network. As indicated previously, however, although a cable-television network is described in detail herein, other types of media-delivery networks, such as a satellite-television network, for example, may be employed within the scope of the invention. It should also be understood that any number of the various components shown may be employed within system 100 within the scope of the present invention.

The system 100 shows an exemplary system in which a media host device, such as the media host device 122, may be used to access presence information for a variety of different communication endpoints and either initiate a new communication session or join an ongoing communication session with a selection of those communication endpoints. Generally, a communication endpoint may be any type of device for which presence information may be accessed and which may engage in communication sessions in accordance with embodiments of the present invention. The wireless device 114 and the CPE 102 devices (including the media host device 122, display device 124, telephone 126, and personal computer (PC) 128) are examples of communication endpoints. The system 100 is also shown with the communication endpoint 110, which is a generic representation of such a device for which presence information may be accessed and which may engage in communication sessions in accordance with embodiments of the present invention.

Devices within system 100 may communicate with each other via the packet network 108. The network 108 may include one or more wide area networks (WANs) and/or one or more local area networks (LANs), as well as one or more public networks, such as the Internet, and/or one or more private networks. For example, the network 108 may include one or more networks operated by one or more media-delivery networks and/or one or more telecommunications networks. Packets may be routed in and among the network 108 using protocols, such as the Internet Protocol (IP), and devices in communication within and among the network 108 may be identified by a network address, such as an IP address. Further, the network 108 may be connected to and communicate with a number of circuit-switched networks (not shown), such as the public-switched telephone network (PSTN), for example.

To maintain presence information for communication endpoints, the system 100 may include a presence server 116. In general, the presence server may include at least two data stores. One data store may maintain presence information for a number of different communication endpoints. Generally, presence information may be any type of data describing the availability of a communication endpoint. Presence information may include, for example, whether a communication endpoint is online, offline, busy, idle, and the type of communication session currently engaged by the communication endpoint. The second data store may maintain permission information for the various communication endpoints. The permission information indicates what other users or devices have permission to access the presence information for a particular communication endpoint.

The presence server 116 may access presence information for communication endpoints in a number of different ways. For example, the presence server 116 may access the presence information directly from a communication endpoint. Alternatively or additionally, the presence server 116 may access presence information for a communication endpoint indirectly from another device. For example, the presence server 116 may access presence information from a network application server, such as a conferencing server, video conferencing server, chat session server, push to talk server, and instant messaging server. Further, the presence server's 116 access to presence information may comprise either a push or pull relationship. For example, the presence server 116 may periodically pull presence information from communication endpoints or devices associated with the endpoints. In addition, communication endpoints or associated devices may push presence information to the presence server 116 on a periodic basis or when there is a status change, for example.

The system 100 may also include a proxy server 118, which may be a network server, switch, or other intelligent control point arranged to send and receive IP datagrams via the network 108. The proxy server 118 may serve as a routing engine allowing users to engage in communication sessions. User requests for communication sessions are routed to the proxy server 118. Based on the requests, the proxy server 118 may then invite other users to join the communication session. The users may then be forwarded to a communication session server, such as the communication session server 120. The proxy server 118 may include a network interface, such as an Ethernet adapter, a processor, and data storage containing program instructions to carry out the functions described herein. For example, the proxy server 118 may contain instructions to conduct communication session control functions in accordance with the present invention.

The communication session server 120 may be identified by a corresponding address and may supply a number of ports at that address for handling respective user connections for communication sessions. The communication session server 120 may include a controller and a data process for handling signaling and data streams, respectively. In an exemplary embodiment, control signaling is handled via the SIP protocol and media transport is handled using the RTP protocol. By way of example only and not limitation, the communication session server 120 may be a conferencing server, a video conferencing server, a chat session server, a push to talk server, or an instant messaging server.

As mentioned previously, the wireless device 114 is shown as an example of a communication endpoint that may engage in communication sessions in accordance with embodiments of the present invention. In general, the wireless device 114 may be any type of device capable of communicating wirelessly via the wireless network 112. By way of example only and not limitation, the wireless device 114 may be a cell phone, a pager, or a personal data assistant (PDA). To provide wireless service to wireless device 114, the wireless network 112 may include a base transceiver station (BTS) (not shown), which provides a wireless coverage area. The BTS may communicate over a wireless air interface with one or more wireless devices, such as the wireless device 114, located in the wireless coverage area. The communication between the BTS and the wireless device 114 may occur in a digital format, such as CDMA, TDMA, GSM, 3G, or 802.11x, or may occur in an analog format, such as AMPS.

To provide wireless device 114 access to the wireless network 114, the BTS may be coupled with a base station controller (BSC) (not shown). The BTS may include a packet control function, and a packet data serving node (PDSN) (not shown) may connect the BSC to the wireless network 114. The PDSN may then act as a network access server, providing the wireless device 114 access to the wireless network 112. Alternatively or additionally, the system 100 may include other network elements for providing mobile device 114 access to the wireless network 112.

The wireless device 114 may be identified by employing any of a number of identifiers. By way of example and not limitation, the wireless device 114 may be identified using a unique Electronic Serial Number (ESN), which is typically hard-coded into the device, a unique Mobile Identification Number (MIN), which is typically assigned to the device by a telecommunications-service provider, a special authentication key (A-key), which may be used for validating the wireless device's 114 identify, and/or a predetermined username and password. In addition, the wireless device 114 may be capable of engaging in packet-data communication and may be identified by a network address, such as an IP address. The network address may be permanently assigned to the wireless device 114 or may be dynamically assigned using a number of methods, such as a Simple IP process or a Mobile IP process.

Among other equipment and devices, CPE 102 may include a media host device 122, a display device 124, a telephone 126, and a personal computer 128. In general, the media host device 122 may be any device arranged to receive and display analog and/or digital television and other content, and which is capable of communicating data with a media-delivery network. By way of example and not limitation, the media host device 122 may be a set-top box (STB), a legacy box, an STB having an integrated cable modem, a digital video recorder (DVR), a personal video recorder (PVR), a hard disk recorder (HDR), a personal video station (PVS), a personal TV receiver (PTR), and/or an integrated terminal device, physically integral to, for example, a television.

Display device 124 could be a television set or any other device capable of presenting television and data content from media host device 122. The functionality of media host device 122 and display device 124 could be incorporated in one device. The telephone 126 may be any of a variety of different types of telecommunication devices. By way of example and not limitation, the telephone 126 may be a circuit-switched telephone, connected to the PSTN via a telephone line (not shown). The telephone 126 may also be a packet-based telephone, arranged to communicate over a network (e.g., the Internet) using, e.g., Voice over Internet Protocol (VoIP) telephony. The telephone 126 could also be a cellular wireless telephone, or some other wireless device capable of telephony operations. In that case, telephone 126 would communicate with a wireless network, such as the wireless network 112, via an air interface. The PC 128 may be any type of general purpose computing device. The PC 128 may be connected to the network via the HFC network 104 and headend/CMTS 106 or another communication means not shown. One skilled in the art will recognize that the CPE 102 may include a variety of other equipment or devices not shown.

Entities on the network 108 are able to communicate with the media host device 122 via a headend/CMTS 106. Television content and other data may be transmitted from the headend/CMTS 106 to the media host device 122 using any suitable media, such as any combination of fiber optic and coaxial cable, making up the HFC network 104. The HFC network 104 may contain a number of fiber nodes (not shown), which enable the transition between the fiber-optic and coaxial-cable portions of the network. Any number of fiber nodes may be used to convert from (i) fiber signals (carried by fiber optic cable from the headend/CMTS 106 to the fiber nodes) to (ii) RF signals (carried by coaxial cable from the fiber nodes to the media host device 122).

The headend/CMTS 106 may be connected to multiple types of sources of television, media, and/or data content. The headend/CMTS 106 may operate to amplify and modulate the video, audio, and data content onto a number of channels, so that the content of these sources may be received by devices, such as the media host device 122. The headend/CMTS 106 may also operate to transmit and receive packet data to and from devices, such as the media host device 122, via the HFC network 104. The packet-data signaling between the headend/CMTS 106 and the media host device 122 via the HFC network 104 may comply with specifications, such as "DAVIC" (Digital Audio Video Council) specifications or "DOCSIS" (Data Over Cable Service Interface Specification) specifications.

The media host device 122 may have a MAC (Media Access Control) address, which will typically be assigned to the device by the manufacturer and will identify the media host device 122 as a unique physical device. In operation, each time the media host device 122 is powered on, it may be registered and authenticated, and its associated media-delivery network may assign the media host device 122 a network address to use until the next time the media host device 122 is booted up. It is to this network address that any data bound for the media host device 122 may be transmitted. The media-delivery network may then associate the media host device's 122 MAC address or another identifier with the media host device's 122 assigned network address. Through this association, the customer's account then has a unique identifier associated with a unique network address on the media-delivery network. Typically, this network address will be an IP address, and the media-delivery network will use IP routing to transmit cable-television content and other data to the media host device. However, proprietary addressing schemes, such as a VPN (Virtual Private Network) or non-routable Private IP network created between the headend/CMTS 106 and the media host device 122 each time the media host device 122 is powered on, may be used as well.

Figure 2:
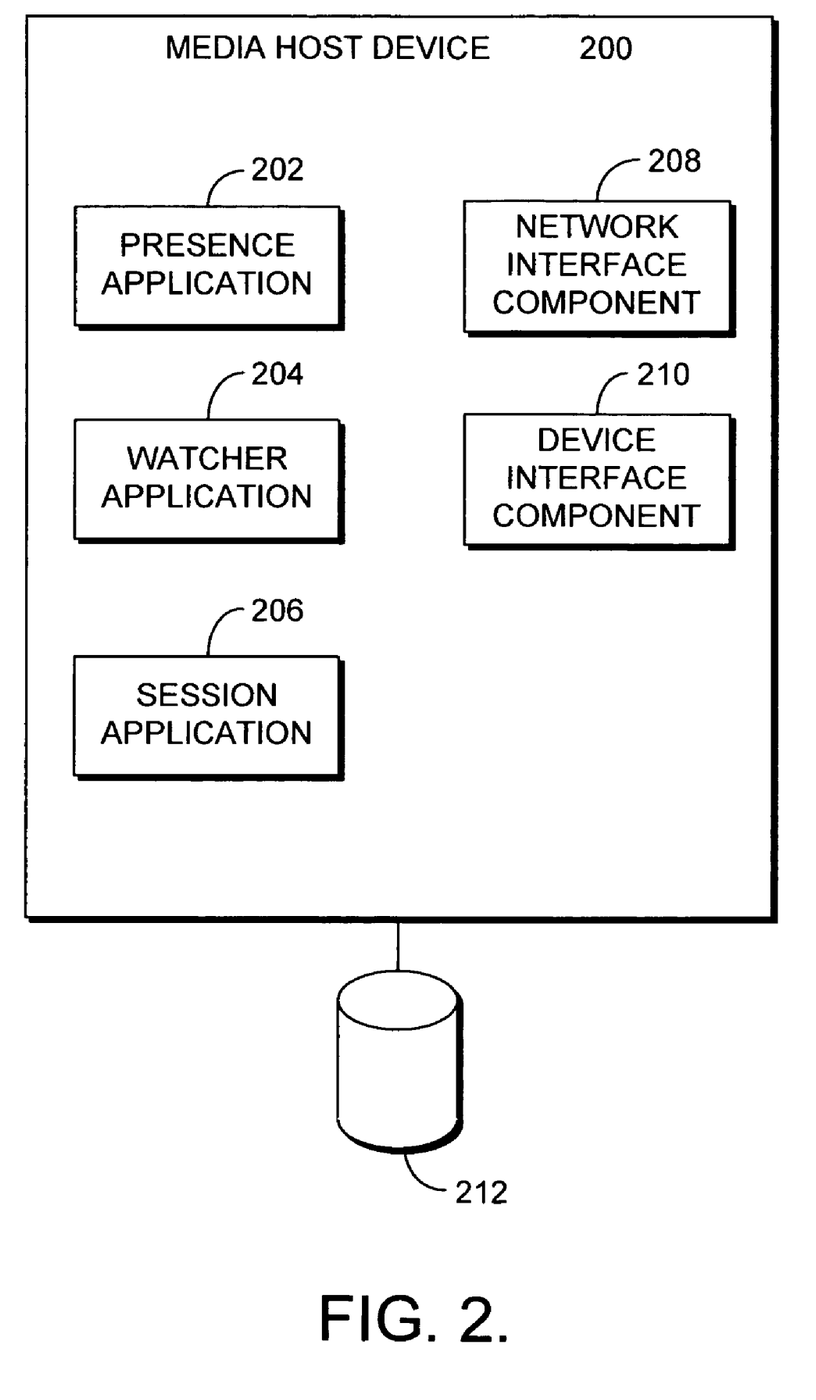
FIG. 2 is a block diagram of an exemplary presence enabled media host device in accordance with an embodiment of the present invention.

In accordance with embodiments of the present invention, the media host device 122 allows a subscriber to access presence information associated with other users' communication endpoints and either initiate a new communication session or join an ongoing communication session. In addition, the media host device 122 may provide presence information associated with the media host device 122 to the presence server 116. In some embodiments, the media host device 122 may also collect and provide presence information for a number of other devices, such as the other CPE 102 devices. Referring to FIG. 2, a media host device 200 in accordance with an embodiment of the present invention will now be described in further detail. Among other components not shown, the media host device 200 may include a presence application 202, a watcher application 204, a session application 206, a network interface component 208, a device interface component 210, and a database 212.

The presence application 202 allows the media host device 200 to provide presence information to a presence server, such as the presence server 116 of FIG. 1. As mentioned previously, the media host device 200 may provide presence information for itself and/or presence information associated with other related devices, such as the other CPE 102 devices. In other words, the media host device 200 may serve as an aggregation point for presence information associated with a number of a devices. To access presence information from other devices, the media host device 200 may include one or more device interface components, such as the device interface component 210. The presence application 202 may have a push and/or pull relationship with the presence server. For example, in some embodiments, the presence application 202 may push presence information to the presence server on a periodic basis and/or when a change in presence status occurs. In addition, in some embodiments, the presence server may pull presence information from the media host device 200 via the presence application 202.

The media host device 200 may also include a watcher application 204, which may communicate with the presence server and access presence information for a variety of other communication endpoints. As with the presence application 202, the watcher application 204 may have a push and/or pull relationship with the presence server. For example, in some embodiments, the watcher application 204 may pull presence information from the presence server. In some embodiments, the presence server may push presence information to the media host device 200 on a periodic basis and/or when a change in presence status occurs. Presence information accessed by the media host device 200 may be stored in the database 212.

To initiate, join, or otherwise engage in communication sessions, the media host device 200 may include a session application 206. The session application 206 may send a request to initiate or join a communication session to a proxy server, such as the proxy server 118 of FIG. 1. The request may include unique identifiers for the communication endpoints with which the subscriber wishes to communicate. In some embodiments, the unique identifiers for the communication endpoints may be stored in the database 212. The request may additionally include a unique identifier for the communication endpoint with which the subscriber will engage in the communication session. For example, the media host device 200 may serve as the communication endpoint (e.g., if the device is equipped with the necessary communication means). Alternatively, another device, such as one of the other CPE 102 devices of FIG. 1, may be employed by the subscriber for the communication session. For example, the subscriber may wish to use a telephone, such as the telephone 126 of FIG. 1, to engage in a session. Accordingly, the request from the media host device 200 would include a unique identifier for the subscriber's telephone.

By way of example only and not limitation, the session application 206 may be a SIP (session initiation protocol) client to allow media host device to send and receive SIP messages to initiate or join a communication session. SIP is a protocol useful for transmitting short messages between entities connected via one or more data networks, and is primarily used to set up, or initiate, media or communication sessions between entities. One skilled in the art will recognize that a multitude of other types of signaling protocols may also be used in connection with the present invention.

The network interface component 208 provides the media host device 200 with connectivity, for example, to the HFC network 104 of FIG. 1. Accordingly, the media host device 200 may communicate with other entities, such as entities shown within system 100 of FIG. 1, via the network interface component 208.

Figure 3:
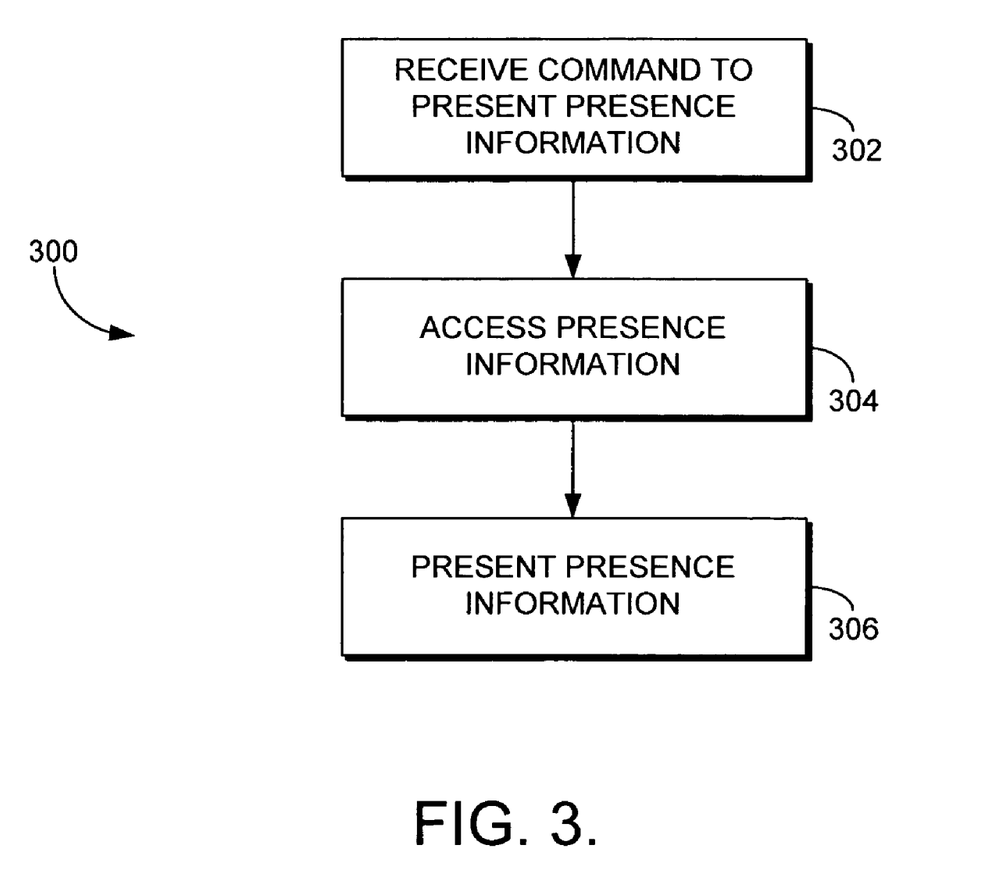
FIG. 3 is a flow diagram showing a method for accessing presence information on a presence enabled media host device in accordance with an embodiment of the present invention.

Referring now to FIG. 3, a flow diagram is shown illustrating a method 300 for accessing presence information on a presence enabled media host device. Initially, the method begins by receiving a command on the media host device to present presence information, as shown at block 302. For example, a subscriber may be watching television and wish to determine what users are currently available for a communication session. The subscriber may select a presence menu option by using a remote control for the media host device, for example, to request the presence information. In the typical scenario, the subscriber would have previously subscribed to access presence information for communication endpoints associated with other users. The users then could either deny or allow the subscriber to access the presence information. Based on those permissions, a "buddy list" would be associated with the subscriber indicating those communication endpoints for which the subscriber has permission to access presence information. Typically, the buddy list would be maintained in the presence server.

At block 304, the media host device may access presence information for the communication endpoints for which the subscriber has access. The media host device may access the presence information in a number of different ways. In some embodiments, the media host device may have a database, such as the database 212 of FIG. 2, for storing presence information for communication endpoints within the subscriber's buddy list. In such embodiments, the media host device simply accesses the presence information stored in the database. The database may be updated with presence information from the presence server. For example, a watcher application, such as the watcher application 204 of FIG. 2, may periodically pull presence information from the presence server and store the information in the database. In addition, the presence server may push presence information to the media host device on a periodic basis and/or when the presence status of a communication endpoint changes. In other embodiments of the present invention, instead of accessing the presence information from a database on the media host device, the watcher application may access the presence information from the presence server after receiving the command to present the presence information.

After accessing the presence information for the various communication endpoints for which the subscriber has access, the media host device presents the presence information to the subscriber, as shown at block 306. Typically, the media host device will communicate the presence information to a display device, such as a television, for example, which will display the presence information. However, other means for presenting the presence information, such as via an audio presentation, may be employed within the scope of the present invention.

Figure 4:
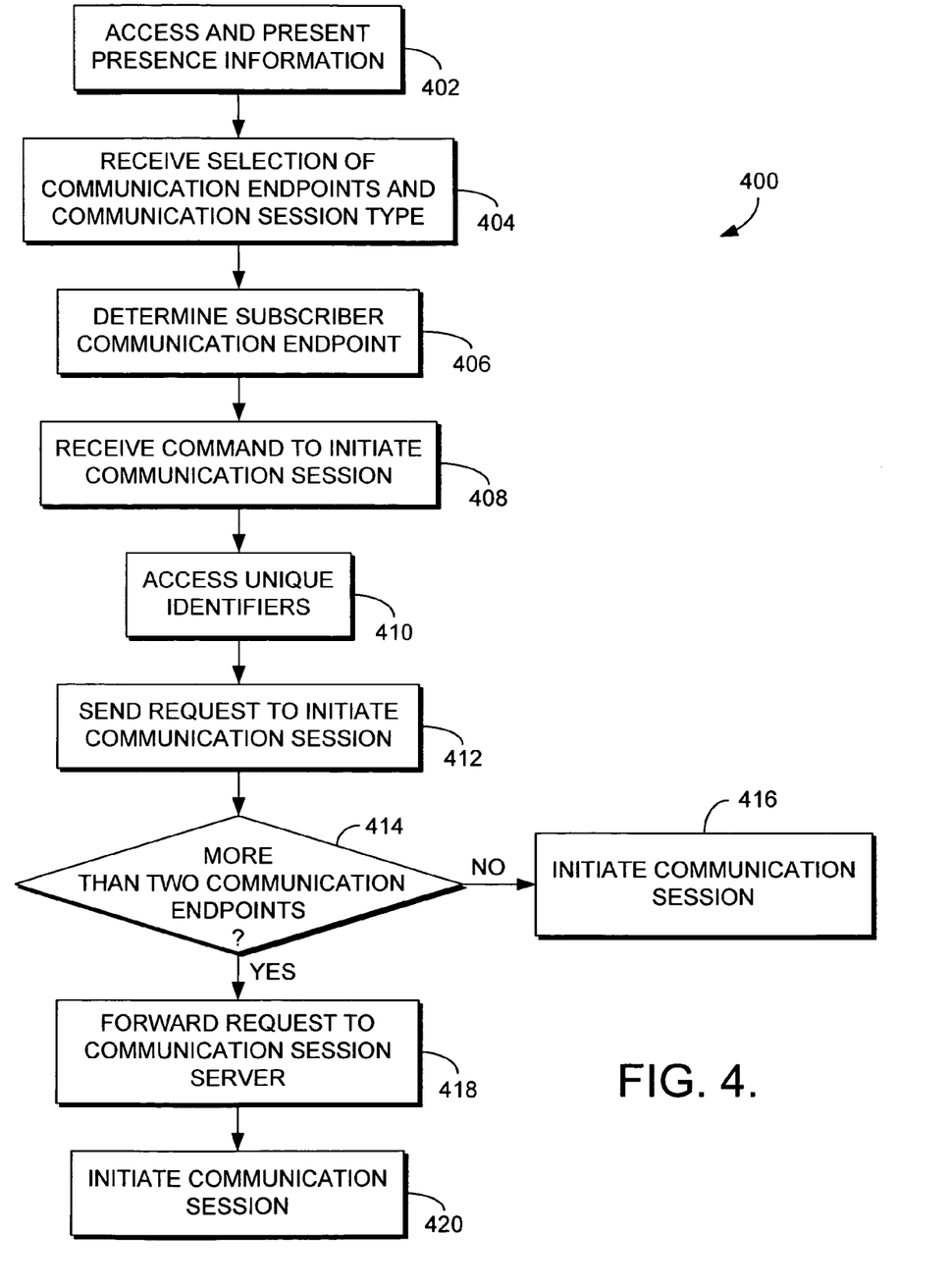
FIG. 4 is a flow diagram showing a method for initiating a communication session from a presence enabled media host device in accordance with an embodiment of the present invention.

Turning to FIG. 4, a flow diagram is provided illustrating a method 400 for initiating a communication session from a presence enabled media host device in accordance with an embodiment of the present invention. For example, a subscriber may be watching a football game and wish to discuss the game with some of his friends. Initially, the subscriber accesses presence information for the other users to determine who is available for a communication session. Accordingly, the media host device will receive a command from the subscriber, access presence information, and present the presence information, as shown, at block 402. A method, such as the method 300 described above with reference to FIG. 3, may be employed to access and present the presence information.

After the presence information has been presented, the subscriber may review the information and using a remote control, for example, select a number of users with whom the subscriber would like to communicate. If a number of different communication endpoints are associated with a user, the subscriber may select a particular communication endpoint for each user. In addition, if the media host device is capable of initiating a variety of different types of communication sessions, the subscriber may be required to specify the type of communication session desired. For example, the subscriber may wish to talk with his friends and may specify a chat session. Accordingly, at block 404, the media host device receives the subscriber's selection.

The subscriber may be able to participate in a communication session from a variety of different communication endpoints. For example, the media host device may have audio, video, or text messaging capability and may serve as a communication endpoint for a communication session. In addition, the subscriber may have a number of other communication endpoints, such as a home telephone, a cell phone, or PC, for example, that the subscriber may wish to use for the communication session. Accordingly, at block 406, the media host device determines which subscriber communication endpoint (i.e. the media host device itself or another associated device) will participate in the communication session. The determination may be automatic based on the type of session selected or other criteria, or the determination may be a manual selection by the subscriber. For example, the subscriber may wish to use his cell phone for a chat session and may indicate the selection to the media host device. Next, the user may select an icon to initiate the communication session. Accordingly, the media host device receives a command to initiate the communication session, as shown at block 408.

Based on the subscriber's selections, the media host device accesses a unique identifier for each of the selected communication endpoints, as shown at block 410. For example, the media host device may store the unique identifier for each communication endpoint within a database and may access the database. Any type of unique identifier may be used within the scope of the present invention. At block 412, the media host device sends a request to initiate a communication session to a network server, such as the proxy server 118 of FIG. 1. For example, the request may be a SIP query to the network server. Alternatively, the request may conform to some other protocol. The query includes the unique identifiers for the selected communication endpoints as well as a unique identifier for the either the media host device or an associated communication endpoint.

If the subscriber selected only one user for the communication session such that there would only be two communication endpoints (i.e. the user communication endpoint and the subscriber communication endpoint), the network server may be able to initiate the session itself. Accordingly, at block 414, the network server determines whether there are more than two communication endpoints (including the subscriber's communication endpoint) for the communication session. If there are only two communication endpoints, the network server initiates the communication session, as shown at block 416. Alternatively, if there are more than two communication endpoints, the network server forwards the request to a communication session server, such as the communication session server 220 of FIG. 1, as shown at block 418. The network server may examine the request and determine the type of communication session requested to determine the type of communication session server required for the session.

At block 420, the communication session server receives the request and initiates the communication session. In some embodiments, the initiation may include sending a message, such as a SIP INVITE message, for example, from the communication session server to each of the user endpoints, as well as the subscriber endpoint. Upon receiving positive acknowledgement from each of the communication endpoints, the communication server then initiates the session.

Figure 5:
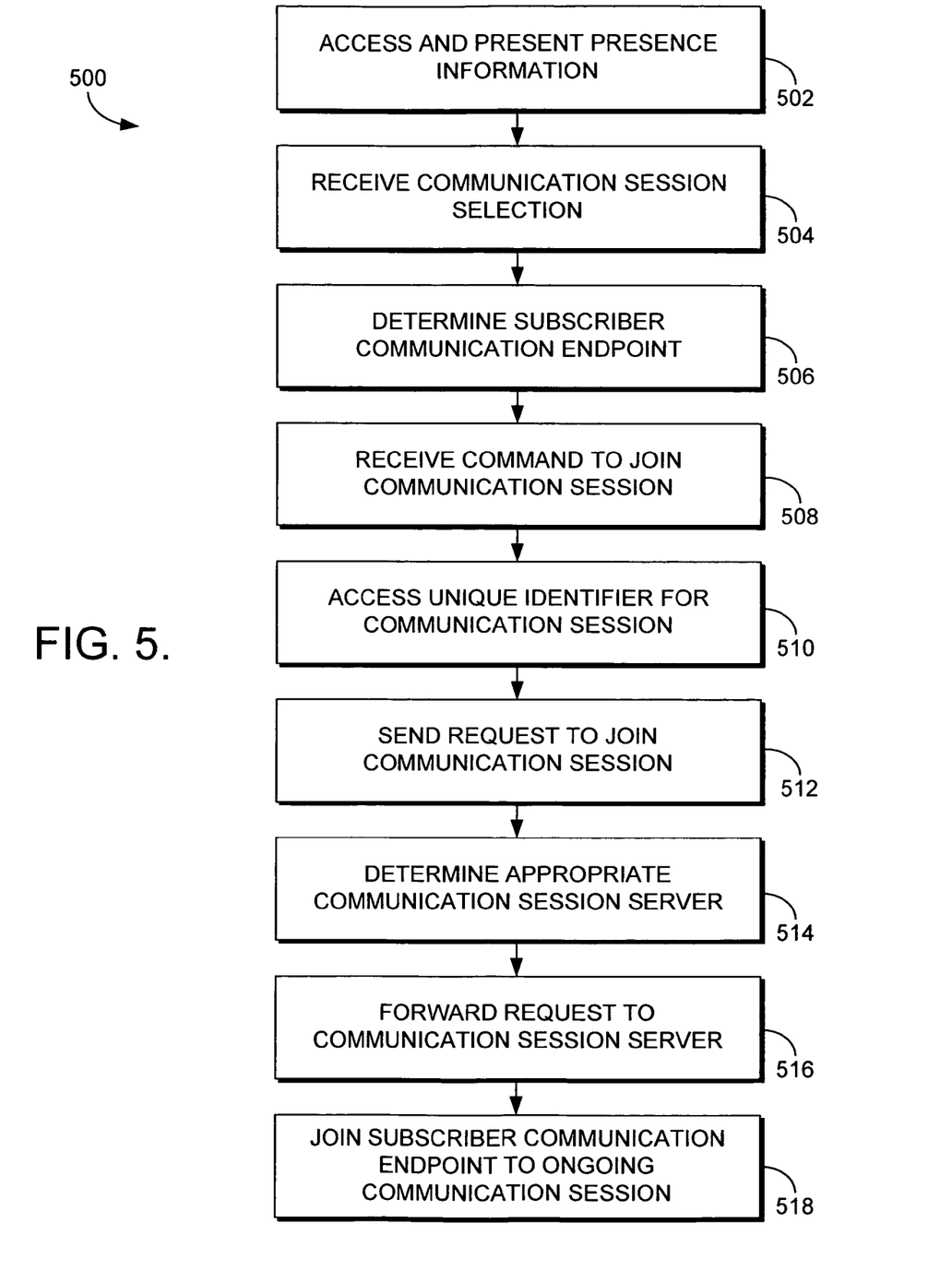
FIG. 5 is a flow diagram showing a method for joining an ongoing communication session from a presence enabled media host device in accordance with an embodiment of the present invention.

FIG. 5 illustrates a flow diagram showing a method 500 for joining an ongoing communication session from a presence enabled media host device in accordance with an embodiment of the present invention. As in the above example described with reference to FIG. 4, a subscriber may be watching a football game, for example, and may wish to discuss the game with his friends. Initially, the subscriber may use a remote control to access a presence information menu via the subscriber's media host device. Accordingly, at block 502, the media host device accesses presence information and presents the presence information to the subscriber. The method 300 described above with reference to FIG. 3 may be employed to access and present the presence information.

Upon viewing the presence information, the subscriber may notice that a number of users are already engaged in a communication session. For example, the presence information may indicate that a number of users are currently in a chat session with one another. The subscriber may wish to join the chat session and using a remote control, for example, may select to join the session. Accordingly, at block 504, the media host device receives the subscriber selection.

As discussed above for method 400, the subscriber may be able to participate in a communication session from a variety of different communication endpoints, such as the media host device itself or an associated communication endpoint. Accordingly, at block 506, the media host device determines which subscriber communication endpoint (i.e. the media host device itself or another associated device) will participate in the communication session. The determination may be automatic based on the type of session the subscriber wishes to join, or the determination may be a manual selection by the subscriber. Next, the user may select an icon to join the session. Accordingly, the media host device receives a command to join the selected communication session, as shown at block 508.

Based on the communication session selected by the subscriber, the media host device accesses a unique identifier for the ongoing communication session, as shown at block 510. The media host device may access the session identifier in a number of different ways within the scope of the present invention. By way of example only and not limitation, the presence information for the users may include the session identifier. At block 512, the media host device sends a request to join the selected communication session to a network server, such as the proxy server 118 of FIG. 1. The request may include the unique identifier for the communication session as well as a unique identifier of the subscriber's communication endpoint. The request may be a SIP query, for example, or may comply with another protocol.

After receiving the request, the network server determines the appropriate communication session server based on the session identifier, as shown at block 514. At block 516, the network server forwards the request to the appropriate communication session server. After receiving the request, the communication session server joins the subscriber's communication endpoint with the ongoing communication session, as shown at block 518. In some embodiments of the present invention, the subscriber must first be authorized before being joined with the session. For example, a network component, such as a proxy server or communication session server, may make a determination whether the subscriber is authorized to join the session.

As can be seen, embodiments of the present invention are directed to initiating communication sessions from a presence enabled media host device. In addition, further embodiments of the present invention are directed to joining an ongoing communication session from a presence enabled media host device. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-usable instructions embodied thereon for causing a presence enabled media host device to perform a method for requesting the initiation of a communication session, the method comprising:

accessing presence information on the presence enabled media host device ("host device"), wherein the presence information comprises information relating to the availability of one or more first communication endpoints;

aggregating presence information for a plurality of second communication endpoints connected to the host device, wherein the second communication endpoints and the media host device are located at a customer premises;

communicating the presence information for the plurality of second communication endpoints from the host device to a presence server, wherein the presence information includes information indicating that a user associated with the one or more second communication endpoints is online, offline, busy, or idle;

receiving a command on the host device-the command requesting establishment of a communication session between at least one of the one or more first communication endpoints and at least one of the one or more second communication endpoints; and communicating a request for the communication session from the media host device to a proxy server, wherein the request is communicated from the host device to the proxy server over a communication pathway comprising:
(A) the host device,
(B) a hybrid fiber coaxial (HFC) network of a television-delivery network connected to the presence enabled media host device,
(C) a headend of the television delivery network in communication with the hybrid fiber coaxial network, wherein communication between the host device and the headend occurs via the HFC network,
(D) a packet network in communication with the headend, and
(E) the proxy server in communication with the packet network, wherein communication between the headend and the proxy server occurs via the packet network, wherein the request for the communication session from the host device is communicated via the HFC network to the headend and from the headend via the packet network to the proxy server.

2. The one or more non-transitory computer-storage media of claim 1, wherein the presence enabled media host device comprises at least one of a set-top box, a legacy box, a digital video recorder, a personal video recorder, a hard disk recorder, a personal video station, a personal TV receiver, and a cable-ready television.

3. The one or more non-transitory computer-storage media of claim 1, wherein accessing presence information comprises:
accessing a database storing the presence information.

4. The one or more non-transitory computer-storage media of claim 1, wherein accessing presence information comprises:
requesting the presence information from the presence server storing the presence information; and
receiving the requested presence information.

5. The one or more non-transitory computer-storage media of claim 1, wherein the method further comprises:
communicating the presence information for presentation to a user.

6. The one or more non-transitory computer-storage media of claim 1, wherein receiving a command on the presence enabled media host device comprises:
receiving a selection of at least one of the one or more first communication endpoints; and
receiving a command to initiate a communication session based on the selection.

7. The one or more non-transitory computer-storage media of claim 6, wherein receiving a command on the presence enabled media host device further comprises:
receiving a selection of one or more second communication endpoints.

8. The one or more non-transitory computer-storage media of claim 6, wherein receiving a command on the presence enabled media host device further comprises:
receiving a selection of a type of communication session.

9. The one or more non-transitory computer-storage media of claim 1, wherein the one or more second communication endpoints comprise the presence enabled media host device.

10. The one or more non-transitory computer-storage media of claim 1, wherein the request for the communication session includes a unique identifier for each of the at least one of the one or more first communication endpoints and the one or more second communication endpoints.

11. A presence enabled media host device for initiating a communication session, the presence enabled media host device including a processor device and one or more non-transitory computer-storage media having embodied thereon computer-useable instructions that, when executed, perform a method for initiating the communication session, the method comprising storing a plurality of applications, the applications comprising:
at the presence enabled media host device ("host device"),
accessing presence information by requesting the presence information from a presence server over a hybrid fiber coaxial (HFC) network of a television-delivery network, wherein the presence information is associated with one or more first communication endpoints;
aggregating presence information for a plurality of second communication endpoints connected to the presence enabled media host device at a customer premises communicating the presence information for the plurality of second communication endpoints from the host device to the presence server via the HFC network of the television-delivery network, wherein the presence information includes information indicating that a user associated with the one or more second communication endpoints is online, offline, busy, or idle; and communicating a request to initiate a communication session between at least one of the one or more first communication endpoints and at least one the plurality of second communication endpoints, wherein the request is communicated from the host device via the HFC network of the television-delivery network.

12. The host device of claim 11, wherein the plurality of second communication endpoints comprise the presence enabled media host device.

13. The host device of claim 11, wherein the session application may access a unique identifier for the at least one of the one or more first communication endpoints and include the unique identifier with the request to initiate the communication session.

14. The host device of claim 11, further comprising:
a device interface component for interfacing with the plurality of second communication endpoints.

15. The host device of claim 11, further comprising a database for storing presence information.

16. A system for facilitating a communication session initiated by a presence enabled media host device, the system comprising:
a presence enabled media host device ("'host device")
(A) for accessing presence information associated with one or more first communication endpoints by requesting the presence information over a hybrid fiber coaxial (HFC) network of a television-delivery network,
(B) for aggregating presence information for a plurality of second communication endpoints connected to the host device, wherein the second communication endpoints and the host device are located at a customer premises,
(C) for communicating the presence information for the plurality of second communication endpoints from the host device to a presence server over the HFC network of the television-delivery network, wherein the presence information includes information indicating that a user associated with the one or more second communication endpoints is online, offline, busy, or idle, and (D) for communicating a request to initiate a communication session between at least one of the one or more first communication endpoints and at least one of the one or more second communication endpoints, wherein the request is communicated from the host device over the HFC network of the television-delivery network through a Cable Modem Terminal System; and
(E) a network server for receiving the request from the host device and initiating the communication session based on the request.

17. The system of claim 16, wherein the one or more second communication endpoints comprise the enabled media host device.

18. The system of claim 16, wherein the request for the communication session includes a unique identifier for each of the at least one of the one or more first communication endpoints and the one or more second communication endpoints.

* * * * *